US006248376B1

(12) United States Patent
Buddemeyer et al.

(10) Patent No.: US 6,248,376 B1
(45) Date of Patent: Jun. 19, 2001

(54) CALCIUM ENRICHMENT COMPOSITION AND METHOD FOR PRODUCING THE SAME

(75) Inventors: Bruce Buddemeyer, Raytown; Weng Kit Cheong, Gladstone; Herman H. Hagedorn, Kansas City, all of MO (US)

(73) Assignee: American Micronutrients, Inc., Independence, MO (US)

( * ) Notice: Subject to any disclaimer, the term of this patent is extended or adjusted under 35 U.S.C. 154(b) by 0 days.

(21) Appl. No.: 09/491,426

(22) Filed: Jan. 26, 2000

(51) Int. Cl.$^7$ ..................................................... A23L 1/304

(52) U.S. Cl. ........................... 426/74; 426/531; 426/590; 426/599

(58) Field of Search .............................. 426/74, 531, 590, 426/599

(56) References Cited

U.S. PATENT DOCUMENTS 4,214,996  7/1980  Buddemeyer et al. .
4,351,735  9/1982  Buddemeyer et al. .

Primary Examiner—Helen Pratt
(74) Attorney, Agent, or Firm—Hovey, Williams, Timmons & Collins

(57) ABSTRACT

An improved calcium-enriched composition and method of supplementing food products with the composition are provided. Broadly, the compositions include respective sources of phosphate ions, citrate ions, and calcium ions, metal hydroxides, and water, with the molar ratio of citrate ions to phosphate ions in the composition being from about 1.0:1.35 to about 1.0:2.35. The compositions have high solids contents relative to prior art compositions, and at least about 70% of the theoretically available calcium ions remain dispersed in the compositions at ambient temperatures. The compositions are in the form of a colloidal suspension having very little or no sedimentation. Finally, the compositions can be mixed with food products (e.g., cow's milk, soy milk) to substantially increase the calcium available in the product without negatively affecting the taste, color, or smell of the product.

61 Claims, No Drawings

CALCIUM ENRICHMENT COMPOSITION AND METHOD FOR PRODUCING THE SAME

BACKGROUND OF THE INVENTION

1. Field of the Invention

The present invention is broadly concerned with calcium-enriched compositions and methods of supplementing food products with those compositions. More particularly, the inventive compositions include respective sources of phosphate ions, citrate ions, and calcium ions, a metal hydroxide, and water. The compositions have high solids contents and are in the form of substantially uniform, colloidal suspensions in which a high percentage of the available calcium ions remains dispersed.

2. Description of the Prior Art

The food industry has long sought stable, water-dispersible forms of calcium which would allow significant amounts of calcium to be introduced into food products without substantially increasing the bulk of the product. To be effective in this context, the calcium-containing substances must be essentially odorless, colorless, tasteless, and producible at a relatively low cost. In addition, these substances must be stable under the extreme conditions dictated by formulation, processing, and storage of the food products.

Numerous food products would benefit from calcium enrichment. For example, animal milk products (particularly those formed from cow's milk) are already considered to be a good dietary source of calcium. However, these products contain only limited quantities of calcium in each serving, requiring the average person to consume a large portion of the product to obtain the recommended daily allowance (RDA) of calcium. Furthermore, some people have medical conditions (e.g., osteoporosis) which require the consumption of calcium beyond that required for others. Therefore, supplemental products which increase the amount of calcium in each serving of milk products at a low cost and without negatively affecting the quality of the milk product are always in demand.

Many people do not consume animal milk products for one reason or another. For example, some people are allergic to these products and cannot safely consume them. There are other people who simply do not consume animal milk products as a lifestyle choice. Many of these people turn to soy milk as an alternative to animal milk products. While the taste and odor of soy milk has been substantially improved in recent years, soy milk does not naturally contain a significant amount of calcium. Thus, soy milk must be supplemented with calcium in order to provide many of these people with at least some calcium in their diets.

Certainly, many calcium supplements have been attempted in the past. The majority of the prior art calcium-enriched products are deficient in that they have extremely low solids contents, leading to products which are mostly water and is thus costly to ship and store. However, when the moisture levels of these products are reduced in order to make shipping and storing more feasible, the calcium generally precipitates out of solution, forming an unappealing sediment.

SUMMARY OF THE INVENTION

The present invention overcomes these problems by broadly providing calcium-enriched compositions having high solids contents of soluble calcium with very little or no sedimentation. It has been discovered that the order of mixing the various ingredients in forming the composition is critical, and thus, modifying the mixing order followed in prior art methods dramatically increases the solids contents of soluble calcium in the composition.

In more detail, the inventive compositions comprise a source of phosphate ions, a source of citrate ions, a source of calcium ions, a quantity of a metal hydroxide, and water. The source of phosphate ions should be provided in sufficient quantities so that the composition comprises from about 5–28% by weight phosphate ions, and preferably from about 8–23% by weight phosphate ions, based upon the total weight of the solids in the composition taken as 100% by weight. The preferred sources of phosphate ions are phosphoric and polyphosphoric acids.

The source of citrate ions should be present in the composition at such a level that the composition comprises from about 5–32% by weight citrate ions, and preferably from about 8–25% by weight citrate ions, based upon the total weight of the solids in the composition taken as 100% by weight. The preferred sources of citrate ions are those selected from the group consisting of citric acid, calcium citrate, potassium citrate, and mixtures thereof, with citric acid being the most preferred source of citrate ions.

In combination with the foregoing citrate and phosphate ion concentrations, each of these concentrations should also be such that the molar ratio of citrate ions to phosphate ions is from about 1.0:1.35 to about 1.0:2.35, and preferably from about 1.0:1.75 to about 1.0:1.95. These ratios are important for obtaining the improved solids contents and calcium yields of the inventive compositions.

The source of calcium ions should be utilized in sufficient quantities to provide from about 2.5–16.5% by weight calcium ions, and preferably from about 4–15% by weight calcium ions, based upon the total weight of the solids in the composition taken as 100% by weight. Preferred sources of calcium ions are those selected from the group consisting of calcium hydroxide, calcium carbonate, calcium oxide, and mixtures thereof. The most preferred sources of calcium ions are calcium hydroxide and calcium oxide.

The metal hydroxide is preferably included in sufficient quantities in the compositions such that the compositions comprise from about 0.5–7.5% by weight of the metal ions, and more preferably from about 0.8–6.5% by weight of the metal ions, based upon the total weight of the solids in the composition taken as 100% by weight. Preferably the metal hydroxide is an alkali metal hydroxide, with potassium hydroxide and sodium hydroxide being particularly preferred.

Finally, water should be included in the composition at a level of from about 0.1–80% by weight, and preferably from about 2.0–50% by weight, based upon the total weight of the composition taken as 100% by weight.

The inventive compositions are prepared by forming a precursor mixture comprising the source of citrate ions, the source of calcium ions, the metal hydroxide, and water. The order of addition of these ingredients during this stage is not critical, although it is preferred that the calcium ion source be added to the water initially, followed by the addition of the metal hydroxide and then the citrate ion source to the resulting mixture. Preferably, mixing is carried out on the intermediate mixtures for about 2–3 minutes after the addition of each ingredient.

The source of phosphate ions is then added to the precursor mixture, followed by intense mixing and heating of the resulting composition to a temperature of about 190–210° F., and preferably about 200° F. until the desired solids content is achieved. That is, the solids content of the inventive compositions is at least about 20% by weight, preferably at least about 35% by weight, and more preferably at least about 45% by weight, based upon the total weight of the composition taken as 100% by weight. It has been discovered that adding the source of phosphate ions to the formed precursor mixture (i.e., after the source of citrate ions has been mixed with the other ingredients) dramatically increases the level of soluble solids in the composition, making these high solids contents obtainable. This improvement substantially lessens the quantity of moisture in the composition that must be shipped and stored and, therefore, will lessen the cost of shipping and storing the compositions.

The resulting compositions have a pH of from about 5.5–7.5, and preferably from about 6.5–7.0. Furthermore, the final compositions comprise at least about 3% by weight calcium ions, and preferably at least about 6% by weight calcium ions, based upon the total weight of the composition taken as 100% by weight. This high calcium ion concentration is a result of the fact that at least about 70%, preferably at least about 80%, and more preferably at least about 90% of the theoretically available quantity of calcium ions will remain dispersed in the unshaken composition (i.e., a composition that has been maintained essentially motionless for at least about 2 days) at ambient temperatures.

In applications where it is desired to produce a dry, reconstitutable product, it is generally preferred to subject the above-described aqueous composition to a drying process (e.g., spray drying or drum drying) until the moisture in the product has been reduced to a level of less than about 5% by weight, and preferably less than about 1% by weight, based upon the total weight of the composition taken as 100% by weight. The resultant solid powder, flake, or granular product can then be reconstituted in aqueous media by mixing it with water at levels of 1 part product with from about 1–4 parts water to form a composition which will exhibit substantially identical properties as those described above with respect to the original aqueous composition.

It will be appreciated that the inventive compositions (either in the concentrated or dried forms) are well-suited for supplementing food products with calcium. Preferred food products which can be supplemented with the calcium-enriched compositions include: dairy products such as milk (e.g., cow's milk) and sour cream; imitation dairy products such as soy milk; soy-based products (e.g., tofu); beverages such as coffee, tea, water, fruit juices, vegetable juices, and other carbonated or non-carbonated beverages; soups; infant foods (e.g., infant formula, baby food); and pureed foods (e.g., applesauce). Other preferred food products include animal foods (e.g., dog food, cat food), mineral or nutritional supplements, mineral tonics, condiments, syrup, sauces (e.g., spaghetti sauce), and dessert products (e.g., pudding, ice cream, whipped topping). Those skilled in the art will appreciate that virtually any product, food or otherwise, in need of calcium supplementation can be enriched according to the invention.

Advantageously, these food products can be supplemented by simply mixing the composition (either aqueous or dried) with the food product under ambient conditions. The supplemented products can be formulated to provide at least 100% of the RDA of calcium (i.e., 1000 mg of calcium ions per day is the RDA, thus, 1000 mg of calcium ions per quart of product would provide 100% of the RDA) or as much as 200% of the RDA of calcium, depending on the serving size. Thus, the food product can be supplemented to contain at least about 100 mg, preferably at least about 500 mg, and more preferably at least about 1000 mg, more calcium ions per serving (e.g., per liter or per gram of food product) than would otherwise be present in the non-supplemented product. This is preferably accomplished by mixing from about 12–60 cc of the aqueous composition or from about 6.0–12.0 g of the dried composition with each liter of food product to be supplemented.

DETAILED DESCRIPTION OF THE PREFERRED EMBODIMENTS

EXAMPLES

The following examples set forth preferred methods in accordance with the invention. It is to be understood, however, that these examples are provided by way of illustration and nothing therein should be taken as a limitation upon the overall scope of the invention.

EXAMPLE 1

The ingredients of Table 1 were combined, with continuous mixing, in the order indicated to yield a calcium-enriched composition having a citric acid:phosphoric acid molar ratio of 1.0:1.35 and a pH of 6.0. The ingredients were added in 2–3 minute intervals. Upon the addition of the final component (i.e., the 75% phosphoric acid solution), the mixture was heated to a temperature of about 210° F. for 30 minutes, followed by further heating at 212° F. until the desired percent solids was achieved.

TABLE 1

| Ingredients | Order of addition | % by weight[a] | Anhydrous moles | Anhydrous molar ratio | Weight in grams |
|---|---|---|---|---|---|
| water | 1 | 68.07 | — | — | 1705 |
| calcium hydroxide | 2 | 6.89 | 2.33 | 2.29 | 172.5 |
| 45% KOH solution | 3 | 10.10 | 2.03 | 2.00 | 252.9 |
| citric acid, anhydrous | 4 | 7.79 | 1.01 | 1.00 | 195.0 |
| 75% phosphoric acid solution | 5 | 7.16 | 1.37 | 1.35 | 179.4 |

[a]% by weight based upon total weight of all ingredients taken as 100% by weight.

The resulting high percent solids final product was a very thick and viscous cream. At a 10% dilution, the product was a colloidal suspension with a trace of sediment being present at the bottom of the container after sitting overnight. Table 2 sets forth the concentrations of the ingredients at various percent solids formulations.

TABLE 2

| Ions | As 24.59% solids | As 20% solids | As 35% solids | As 100% solids |
|---|---|---|---|---|
| Calcium | 3.72%[a] | 3.03% | 5.30% | 15.15%[b] |
| Potassium | 1.42% | 1.16% | 2.03% | 5.80%[b] |
| Citrate | 7.66% | 6.23% | 10.90% | 31.15%[b] |
| Phosphate | 5.21% | 4.23% | 7.41% | 21.17%[b] |

[a]The percent weight of ions is based upon the percent sids taken as 100% by weight.
[b]Percent of ions that would be available if the 100% solids product were diluted.

TABLE 3

| Property | Value |
| --- | --- |
| pH | 6.0 |
| % solids | 31.0%[a] |
| % calcium | 4.9%[a] |
| % yield | 90.7%[b] |

[a]% by weight based upon total weight of composition taken as 100% by weight.
[b]% yield of calcium ion based upon the quantity of calcium ion added during preparation of the composition.

EXAMPLE 2

The ingredients of Table 4 were combined, with continuous mixing, in the order indicated to yield a calcium-enriched composition having a citric acid:phosphoric acid molar ratio of 1.0:1.35 and a pH of 6.7. The ingredients were added in 2–3 minute intervals. Upon the addition of the final component (i.e., the 75% phosphoric acid solution), the mixture was heated to a temperature of about 210° F. for 30 minutes, followed by further heating at 212° F. until the desired percent solids was achieved.

TABLE 4

| Ingredients | Order of addition | % by weight[a] | Anhydrous moles | Anhydrous molar ratio | Weight in grams |
| --- | --- | --- | --- | --- | --- |
| water | 1 | 66.89 | — | — | 5800 |
| calcium hydroxide | 2 | 6.76 | 7.92 | 2.29 | 586.6 |
| 45% KOH solution | 3 | 11.67 | 8.12 | 2.00 | 1011.7 |
| citric acid, anhydrous | 4 | 7.65 | 3.45 | 1.00 | 663.0 |
| 75% phosphoric acid solution | 5 | 7.03 | 4.67 | 1.35 | 610.0 |

[a]% by weight based upon total weight of all ingredients taken as 100% by weight.

The resulting high percent solids final product was a very thick, viscous liquid. At a 10% dilution, the product was a colloidal suspension with no sediment being present at the bottom of the container after sitting overnight. Table 5 sets forth the concentrations of the ingredients at various percent solids formulations. Table 6 lists additional properties of the product, with the percent calcium determined by atomic absorption spectrophotometric assays.

TABLE 5

| Ions | As 24.94% solids | As 20% solids | As 35% solids | As 100% solids |
| --- | --- | --- | --- | --- |
| Calcium | 3.66%[a] | 2.93% | 5.13% | 14.67%[b] |
| Potassium | 1.65% | 1.32% | 2.31% | 6.60%[b] |
| Citrate | 7.53% | 6.03% | 10.56% | 30.18%[b] |
| Phosphate | 5.11% | 4.10% | 7.18% | 20.50%[b] |

[a]The percent weight of ions is based upon the percent solids taken as 100% by weight.
[b]Percent of ions that would be available if the 100% solids product were diluted.

TABLE 6

| Property | Value |
| --- | --- |
| pH | 6.7 |
| % solids | 52.5%[a] |
| % calcium | 7.2%[a] |
| % yield | 93.5%[b] |

[a]% by weight based upon total weight of composition taken as 100% by weight.
[b]% yield of calcium ion based upon the quantity of calcium ion added during preparation of the composition.

EXAMPLE 3

The ingredients of Table 7 were combined, with continuous mixing, in the order indicated to yield a calcium-enriched composition having a citric acid:phosphoric acid molar ratio of 1.0:1.35 and a pH of 7.4. The ingredients were added in 2–3 minute intervals. Upon the addition of the final component (i.e., the 75% phosphoric acid solution), the mixture was heated to a temperature of about 210° F. for 30 minutes, followed by further heating at 212° F. until the desired percent solids was achieved.

TABLE 7

| Ingredients | Order of addition | % by weight[a] | Anhydrous moles | Anhydrous molar ratio | Weight in grams |
| --- | --- | --- | --- | --- | --- |
| water | 1 | 66.09 | — | — | 1160 |
| calcium hydroxide | 2 | 6.68 | 1.58 | 2.29 | 117.3 |
| 45% KOH solution | 3 | 12.68 | 1.79 | 2.59 | 222.6 |
| citric acid, anhydrous | 4 | 7.56 | 0.69 | 1.00 | 132.6 |
| 75% phosphoric acid solution | 5 | 6.99 | 0.94 | 1.35 | 122.6 |

[a]% by weight based upon total weight of all ingredients taken as 100% by weight.

The resulting high percent solids final product was a viscous, colloidal liquid. At a 10% dilution, the product was a colloidal suspension with a moderate amount of sediment being present at the bottom of the container after sitting overnight. Table 8 sets forth the concentrations of the ingredients at various percent solids formulations. Table 9 lists additional properties of the product, with the percent calcium determined by atomic absorption spectrophotometric assays.

TABLE 8

| Ions | As 25.17% solids | As 20% solids | As 35% solids | As 100% solids |
| --- | --- | --- | --- | --- |
| Calcium | 3.62%[a] | 2.88% | 5.03% | 14.38%[b] |
| Potassium | 1.79% | 1.42% | 2.49% | 7.11%[b] |
| Citrate | 7.44% | 5.91% | 10.34% | 29.54%[b] |
| Phosphate | 5.08% | 4.04% | 7.06% | 20.18%[b] |

[a]The percent weight of ions is based upon the percent solids taken as 100% by weight.
[b]Percent of ions that would be available if the 100% solids product were diluted.

TABLE 9

| Property | Value |
|---|---|
| pH | 7.4 |
| % solids | 46.7%[a] |
| % calcium | 6.6%[a] |
| % yield | 99.0%[b] |

[a]% by weight based upon total weight of composition taken as 100% by weight.
[b]% yield of calcium ion based upon the quantity of calcium ion added during preparation of the composition.

EXAMPLE 4

The ingredients of Table 10 were combined, with continuous mixing, in the order indicated to yield a calcium-enriched composition having a citric acid phosphoric acid molar ratio of 1.0:1.86 and a pH of 5.9. The ingredients were added in 2–3 minute intervals. Upon the addition of the final component (i.e., the 75% phosphoric acid solution), the mixture was heated to a temperature of about 210° F. for 30 minutes, followed by further heating at 212° F. until the desired percent solids was achieved.

TABLE 10

| Ingredients | Order of addition | % by weight[a] | Anhydrous moles | Anhydrous molar ratio | Weight in grams |
|---|---|---|---|---|---|
| water | 1 | 67.61 | — | — | 7000 |
| calcium hydroxide | 2 | 7.08 | 9.89 | 2.78 | 733.0 |
| 45% KOH solution | 3 | 10.39 | 8.63 | 2.43 | 1076.2 |
| citric acid, anhydrous | 4 | 6.59 | 3.55 | 1.00 | 682.5 |
| 75% phosphoric acid solution | 5 | 8.33 | 6.60 | 1.86 | 862.2 |

[a]% by weight based upon total weight of all ingredients taken as 100% by weight.

The resulting high percent solids final product was a very viscous liquid. At a 10% dilution, the product was a colloidal suspension with a moderate amount of sediment being present at the bottom of the container after sitting overnight. Table 11 sets forth the concentrations of the ingredients at various percent solids formulations. Table 12 lists additional properties of the product, with the percent calcium determined by atomic absorption spectrophotometric assays.

TABLE 11

| Ions | As 24.59% solids | As 20% solids | As 35% solids | As 100% solids |
|---|---|---|---|---|
| Calcium | 3.83%[a] | 3.12% | 5.45% | 15.58%[b] |
| Potassium | 1.47% | 1.19% | 2.09% | 5.97%[b] |
| Citrate | 6.49% | 5.28% | 9.24% | 26.39%[b] |
| Phosphate | 6.05% | 4.92% | 8.61% | 24.62%[b] |

[a]The percent weight of ions is based upon the percent solids taken as 100% by weight.
[b]Percent of ions that would be available if the 100% solids product were diluted.

TABLE 12

| Property | Value |
|---|---|
| pH | 5.9 |
| % solids | 38.6%[a] |
| % calcium | 6.4%[a] |
| % yield | 95.0%[b] |

[a]% by weight based upon total weight of composition taken as 100% by weight.
[b]% yield of calcium ion based upon the quantity of calcium ion added during preparation of the composition.

EXAMPLE 5

The ingredients of Table 13 were combined, with continuous mixing, in the order indicated to yield a calcium-enriched composition having a citric acid:phosphoric acid molar ratio of 1.0:1.86 and a pH of 6.8. The ingredients were added in 2–3 minute intervals. Upon the addition of the final component (i.e., the 75% phosphoric acid solution), the mixture was heated to a temperature of about 210° F. for 30 minutes, followed by further heating at 212° F. until the desired percent solids was achieved.

TABLE 13

| Ingredients | Order of addition | % by weight[a] | Anhydrous moles | Anhydrous molar ratio | Weight in grams |
|---|---|---|---|---|---|
| water | 1 | 66.40 | — | — | 5600 |
| calcium hydroxide | 2 | 6.96 | 7.92 | 2.79 | 586.6 |
| 45% KOH solution | 3 | 12.00 | 8.12 | 2.86 | 1011.7 |
| citric acid, anhydrous | 4 | 6.47 | 2.84 | 1.00 | 546.0 |
| 75% phosphoric acid solution | 5 | 8.18 | 5.28 | 1.86 | 689.9 |

[a]% by weight based upon total weight of all ingredients taken as 100% by weight.

The resulting high percent solids final product was a very thick, viscous liquid. At a 10% dilution, the product was a colloidal suspension with no sediment being present at the bottom of the container after sitting overnight. Table 14 sets forth the concentrations of the ingredients at various percent solids formulations. Table 15 lists additional properties of the product, with the percent calcium determined by atomic absorption spectrophotometric assays.

TABLE 14

| Ions | As 24.96% solids | As 20% solids | As 35% solids | As 100% solids |
|---|---|---|---|---|
| Calcium | 3.76%[a] | 3.01% | 5.27% | 15.07%[b] |
| Potassium | 1.69% | 1.36% | 2.37% | 6.78%[b] |
| Citrate | 6.37% | 5.11% | 8.94% | 25.53%[b] |
| Phosphate | 5.95% | 4.76% | 8.33% | 23.82%[b] |

[a]The percent weight of ions is based upon the percent solids taken as 100% by weight.
[b]Percent of ions that would be available if the 100% solids product were diluted.

TABLE 15

| Property | Value |
| --- | --- |
| pH | 6.8 |
| % solids | 44.2%[a] |
| % calcium | 5.63%[a] |
| % yield | 84.6%[b] |

[a]% by weight based upon total weight of composition taken as 100% by weight.
[b]% yield of calcium ion based upon the quantity of calcium ion added during preparation of the composition.

EXAMPLE 6

The ingredients of Table 16 were combined, with continuous mixing, in the order indicated to yield a calcium-enriched composition having a citric acid:phosphoric acid molar ratio of 1.0:1.86 and a pH of 7.6. The ingredients were added in 2–3 minute intervals. Upon the addition of the final component (i.e., the 75% phosphoric acid solution), the mixture was heated to a temperature of about 210° F. for 30 minutes, followed by further heating at 212° F. until the desired percent solids was achieved.

TABLE 16

| Ingredients | Order of addition | % by weight[a] | Anhydrous moles | Anhydrous molar ratio | Weight in grams |
| --- | --- | --- | --- | --- | --- |
| water | 1 | 69.77 | — | — | 1413.0 |
| calcium hydroxide | 2 | 6.05 | 1.65 | 2.79 | 122.5 |
| 45% KOH solution | 3 | 11.43 | 1.86 | 3.14 | 231.5 |
| citric acid, anhydrous | 4 | 5.61 | 0.59 | 1.00 | 113.7 |
| 75% phosphoric acid solution | 5 | 7.14 | 1.11 | 1.86 | 144.5 |

[a]% by weight based upon total weight of all ingredients taken as 100% by weight.

The resulting high percent solids final product was a viscous liquid. At a 10% dilution, the product was a colloidal suspension with no sediment being present at the bottom of the container after sitting overnight. Table 17 sets forth the concentrations of the ingredients at various percent solids formulations. Table 18 lists additional properties of the product, with the percent calcium determined by atomic absorption spectrophotometric assays.

TABLE 17

| Ions | As 22.9% solids | As 20% solids | As 35% solids | As 100% solids |
| --- | --- | --- | --- | --- |
| Calcium | 3.27%[a] | 2.86% | 5.00% | 14.28%[b] |
| Potassium | 7.95% | 6.94% | 2.15% | 34.72%[b] |
| Citrate | 5.52% | 4.82% | 8.44% | 24.10%[b] |
| Phosphate | 6.92% | 6.05% | 10.59% | 30.25%[b] |

[a]The percent weight of ions is based upon the percent solids taken as 100% by weight.
[b]Percent of ions that would be available if the 100% solids product were diluted.

TABLE 18

| Property | Value |
| --- | --- |
| pH | 8.0 |
| % solids | 22.9%[a] |
| % calcium | 4.22%[a] |
| % yield | 99.0%[b] |

[a]% by weight based upon total weight of composition taken as 100% by weight.
[b]% yield of calcium ion based upon the quantity of calcium ion added during preparation of the composition.

EXAMPLE 7

The ingredients of Table 19 were combined, with continuous mixing, in the order indicated to yield a calcium-enriched composition having a citric acid:phosphoric acid molar ratio of 1.0:2.33 and a pH of 5.7. The ingredients were added in 2–3 minute intervals. Upon the addition of the final component (i.e., the 75% phosphoric acid solution), the mixture was heated to a temperature of about 210° F. for 30 minutes, followed by further heating at 212° F. until the desired percent solids was achieved.

TABLE 19

| Ingredients | Order of addition | % by weight[a] | Anhydrous moles | Anhydrous molar ratio | Weight in grams |
| --- | --- | --- | --- | --- | --- |
| water | 1 | 72.07 | — | — | 6600 |
| calcium hydroxide | 2 | 6.40 | 7.91 | 3.25 | 586.4 |
| 45% KOH solution | 3 | 8.30 | 6.10 | 2.50 | 760.0 |
| citric acid, anhydrous | 4 | 5.11 | 2.44 | 1.00 | 468.0 |
| 75% phosphoric acid solution | 5 | 8.12 | 5.69 | 2.33 | 743.2 |

[a]% by weight based upon total weight of all ingredients taken as 100% by weight.

The resulting high percent solids final product was a very thick viscous liquid. At a 10% dilution, the product was a colloidal suspension with a trace amount of sediment being present at the bottom of the container after sitting overnight. Table 20 sets forth the concentrations of the ingredients at various percent solids formulations. Table 21 lists additional properties of the product, with the percent calcium determined by atomic absorption spectrophotometric assays.

TABLE 20

| Ions | As 21.34% solids | As 20% solids | As 35% solids | As 100% solids |
| --- | --- | --- | --- | --- |
| Calcium | 3.46%[a] | 3.25% | 5.68% | 16.23%[b] |
| Potassium | 1.17% | 1.10% | 1.92% | 5.49%[b] |
| Citrate | 5.03% | 4.71% | 8.25% | 23.57%[b] |
| Phosphate | 5.90% | 5.53% | 9.67% | 27.64%[b] |

[a]The percent weight of ions is based upon the percent solids taken as 100% by weight.
[b]Percent of ions that would be available if the 100% solids product were diluted.

TABLE 21

| Property | Value |
| --- | --- |
| pH | 5.7 |
| % solids | 34.5%[a] |
| % calcium | 5.7%[a] |
| % yield | 86.4%[b] |

[a]% by weight based upon total weight of composition taken as 100% by weight.
[b]% yield of calcium ion based upon the quantity of calcium ion added during preparation of the composition.

TABLE 24

| Property | Value |
| --- | --- |
| pH | 7.2 |
| % solids | 52.1%[a] |
| % calcium | 8.1%[a] |
| % yield | 90.0%[b] |

[a]% by weight based upon total weight of composition taken as 100% by weight.
[b]% yield of calcium ion based upon the quantity of calcium ion added during preparation of the composition.

EXAMPLE 8

The ingredients of Table 22 were combined, with continuous mixing, in the order indicated to yield a calcium-enriched composition having a citric acid:phosphoric acid molar ratio of 1.0:2.33 and a pH of 7.2. The ingredients were added in 2–3 minute intervals. Upon the addition of the final component (i.e., the 75% phosphoric acid solution), the mixture was heated to a temperature of about 210° F. for 30 minutes, followed by further heating at 212° F. until the desired percent solids was achieved.

EXAMPLE 9

The ingredients of Table 25 were combined, with continuous mixing, in the order indicated to yield a calcium-enriched composition having a citric acid:phosphoric acid molar ratio of 1.0:2.33 and a pH of 7.2. The ingredients were added in 2–3 minute intervals. Upon the addition of the final component (i.e., the 75% phosphoric acid solution), the mixture was heated to a temperature of about 210° F. for 30 minutes, followed by further heating at 212° F. until the desired percent solids was achieved.

TABLE 22

| Ingredients | Order of addition | % by weight[a] | Anhydrous moles | Anhydrous molar ratio | Weight in grams |
| --- | --- | --- | --- | --- | --- |
| water | 1 | 66.12 | — | — | 5480 |
| calcium hydroxide | 2 | 7.08 | 7.92 | 3.25 | 586.6 |
| 45% KOH | 3 | 12.19 | 8.11 | 3.33 | 100.7 |
| citric acid, anhydrous | 4 | 5.65 | 2.44 | 1.00 | 468.2 |
| 75% phosphoric acid solution | 5 | 8.96 | 5.68 | 2.33 | 742.4 |

[a]% by weight based upon total weight of all ingredients taken as 100% by weight.

TABLE 25

| Ingredients | Order of addition | % by weight[a] | Anhydrous moles | Anhydrous molar ratio | Weight in grams |
| --- | --- | --- | --- | --- | --- |
| water | 1 | 69.45 | — | — | 6600 |
| calcium hydroxide | 2 | 6.21 | 7.96 | 3.26 | 590.0 |
| 45% KOH solution | 3 | 11.59 | 8.83 | 3.62 | 1101.3 |
| citric acid, anhydrous | 4 | 4.94 | 2.44 | 1.00 | 469.0 |
| 75% phosphoric acid solution | 5 | 7.82 | 5.68 | 2.33 | 742.7 |

[a]% by weight based upon total weight of all ingredients taken as 100% by weight.

The resulting high percent solids final product was a very thick viscous liquid. At a 10% dilution, the product was a colloidal suspension with a moderate amount of sediment being present at the bottom of the container after sitting overnight. Table 23 sets forth the concentrations of the ingredients at various percent solids formulations. Table 24 lists additional properties of the product, with the percent calcium determined by atomic absorption spectrophotometric assays.

The resulting high percent solids final product was a viscous liquid. At a 10% dilution, the product was a colloidal suspension with a trace amount of sediment being present at the bottom of the container after sitting overnight. Table 26 sets forth the concentrations of the ingredients at various percent solids formulations. Table 27 lists additional properties of the product, with the percent calcium determined by atomic absorption spectrophotometric assays.

TABLE 23

| Ions | As 24.93% solids | As 20% solids | As 35% solids | As 100% solids |
| --- | --- | --- | --- | --- |
| Calcium | 3.83%[a] | 3.07% | 5.38% | 15.36%[b] |
| Potassium | 1.72% | 1.38% | 2.42% | 6.90%[b] |
| Citrate | 5.56% | 4.46% | 7.81% | 22.31%[b] |
| Phosphate | 6.51% | 5.22% | 9.14% | 26.12%[b] |

[a]The percent weight of ions is based upon the percent solids taken as 100% by weight.
[b]Percent of ions that would be available if the 100% solids product were diluted.

TABLE 26

| Ions | As 22.22% solids | As 20% solids | As 35% solids | As 100% solids |
| --- | --- | --- | --- | --- |
| Calcium | 3.36%[a] | 3.36% | 5.29% | 5.12%[b] |
| Potassium | 1.64% | 1.47% | 2.58% | 7.36%[b] |
| Citrate | 4.86% | 4.37% | 7.65% | 21.86%[b] |
| Phosphate | 5.68% | 5.11% | 8.95% | 25.57%[b] |

[a]The percent weight of ions is based upon the percent solids taken as 100% by weight.
[b]Percent of ions that would be available if the 100% solids product were diluted.

TABLE 27

| Property | Value |
|---|---|
| pH | 7.2 |
| % solids | 34.9%[a] |
| % calcium | 6.0%[a] |
| % yield | 85.7%[b] |

[a]% by weight based upon total weight of composition taken as 100% by weight.
[b]% yield of calcium ion based upon the quantity of calcium ion added during preparation of the composition.

In each of the following three examples (Examples 10–12) different types of ingredients were utilized.

EXAMPLE 10

In this example, 115% polyphosphoric acid was used in place of a 75% phosphoric acid solution. The ingredients of Table 28 were combined, with continuous mixing, in the order indicated to yield a calcium-enriched composition having a citric acid:phosphoric acid molar ratio of 1.0:1.86 and a pH of 7.0. The ingredients were added in 2–3 minute intervals. Upon the addition of the final component (i.e., the 115% polyphosphoric acid solution mixed with water), the mixture was heated to a temperature of about 210° F. for 30 minutes, followed by further heating at 212° F. until the desired percent solids was achieved.

TABLE 28

| Ingredients | Order of addition | % by weight[a] | Anhydrous moles | Anhydrous molar ratio | Weight in grams |
|---|---|---|---|---|---|
| water | 1 | 70.27 | — | — | 1700 |
| calcium hydroxide | 2 | 6.73 | 2.20 | 2.78 | 162.8 |
| 45% KOH solution | 3 | 11.56 | 2.24 | 2.84 | 279.8 |
| citric acid, anhydrous | 4 | 6.27 | 0.79 | 1.00 | 151.6 |
| 115% polyphosphoric acid solution + 200 ml of water from step 1 | 5 | 5.17 | 1.47 | 1.86 | 125.1 |

[a]% by weight based upon total weight of all ingredients taken as 100% by weight.

The resulting high percent solids final product was a viscous liquid. At a 10% dilution, the product was a colloidal suspension with a slight amount of sediment being present at the bottom of the container after sitting overnight. Table 29 lists additional properties of the product, with the percent calcium determined by atomic absorption spectrophotometric assays.

TABLE 29

| Property | Value |
|---|---|
| pH | 7.0 |
| % solids | 24.5%[a] |
| % calcium | 3.64%[a] |
| % yield | 99.0%[b] |

[a]% by weight based upon total weight of composition taken as 100% by weight.
[b]% yield of calcium ion based upon the quantity of calcium ion added during preparation of the composition.

EXAMPLE 11

In this example, sodium hydroxide was used in combination with potassium hydroxide. The ingredients of Table 30 were combined, with continuous mixing, in the order indicated to yield a calcium-enriched composition having a citric acid:phosphoric acid molar ratio of 1.0:1.87 and a pH of 7.4. The ingredients were added in 2–3 minute intervals. Upon the addition of the final component (i.e., the 75% phosphoric acid), the mixture was heated to a temperature of about 210° F. for 30 minutes, followed by further heating at 212° F. until the desired percent solids was achieved.

TABLE 30

| Ingredients | Order of addition | % by weight[a] | Anhydrous moles | Anhydrous molar ratio | Weight in grams |
|---|---|---|---|---|---|
| water | 1 | 72.83 | — | — | 1432.8 |
| calcium hydroxide | 2 | 6.25 | 1.65 | 2.80 | 122.9 |
| 45% KOH solution | 3 | 5.87 | 0.93 | 1.57 | 115.54 |
| sodium hydroxide | 4 | 1.90 | 0.93 | 1.57 | 37.4 |
| citric acid, anhydrous | 5 | 5.78 | 0.59 | 1.00 | 113.8 |
| 75% phosphoric acid solution | 6 | 7.37 | 1.10 | 1.87 | 144.9 |

[a]% by weight based upon total weight of all ingredients taken as 100% by weight.

The resulting high percent solids final product was a viscous liquid. At a 10% dilution, the product was a colloidal suspension with a trace amount of sediment being present at the bottom of the container after sitting overnight. Table 31 lists additional properties of the product, with the percent calcium determined by atomic absorption spectrophotometric assays.

TABLE 31

| Property | Value |
|---|---|
| pH | 7.4 |
| % solids | 20.3%[a] |
| % calcium | 3.45%[a] |
| % yield | 99.0%[b] |

[a]% by weight based upon total weight of composition taken as 100% by weight.
[b]% yield of calcium ion based upon the quantity of calcium ion added during preparation of the composition.

EXAMPLE 12

In this example, calcium carbonate was used instead of calcium hydroxide. The ingredients of Table 32 were combined, with continuous mixing, in the order indicated to yield a calcium-enriched composition having a citric acid:phosphoric acid molar ratio of 1.0:1.88 and a pH of 9.0. The ingredients were added in 2–3 minute intervals. Upon the addition of the final component (i.e., the 75% phosphoric acid), the mixture was heated to a temperature of about 210° F. for 30 minutes, followed by further heating at 212° F. until the desired percent solids was achieved.

TABLE 32

| Ingredients | Order of addition | % by weight[a] | Anhydrous moles | Anhydrous molar ratio | Weight in grams |
|---|---|---|---|---|---|
| water | 1 | 69.85 | — | — | 1595 |
| calcium carbonate | 2 | 7.16 | 1.65 | 2.80 | 163.5 |
| 45% KOH solution | 3 | 11.63 | 2.13 | 3.60 | 265.4 |
| citric acid, anhydrous | 4 | 5.00 | 0.59 | 1.00 | 113.9 |
| 75% phosphoric acid solution | 5 | 6.36 | 1.11 | 1.88 | 145.13 |

[a]% by weight based upon total weight of all ingredients taken as 100% by weight.

The resulting high percent solids final product was a viscous liquid. At a 10% dilution, the product was a colloidal suspension with a slight amount of sediment being present at the bottom of the container after sitting overnight. Table 33 lists additional properties of the product, with the percent calcium determined by atomic absorption spectrophotometric assays.

TABLE 33

| Property | Value |
|---|---|
| pH | 9.0 |
| % solids | 20.6%[a] |
| % calcium | 2.98%[a] |
| % yield | 99.0%[b] |

[a]% by weight based upon total weight of composition taken as 100% by weight.
[b]% yield of calcium ion based upon the quantity of calcium ion added during preparation of the composition.

EXAMPLE 13

The ingredients of Table 34 were mixed together in the order indicated to yield a calcium-enriched composition having a citric acid:phosphoric acid molar ratio of 1.0:1.67 and a pH of 6.5. The ingredients were added in 2–3 minute intervals. Upon the addition of the final component (i.e., the 75% phosphoric acid solution), the mixture was heated to a temperature of about 200° F. and mixing was continued for 30 minutes. Then, the mixture was further heated to 212° F. and stirring was continued until a 45% solids content was achieved. Mixing was carried out utilizing an INDCO mixer (INDCO, Inc., New Albany, Ind.). The 1000-gallon, jacketed mixer was equipped with a 2-speed, 3- to 6-horsepower, gear-head which drove a sweep agitator blade and a 10-horsepower motor belt drive that powered a 10-inch, design D, INDCO dispersion blade.

TABLE 34

| Ingredients | Order of addition | % by weight[a] | Anhydrous moles | Anhydrous molar ratio | Weight in grams |
|---|---|---|---|---|---|
| water | 1 | 73.83 | — | — | 1900.0 |
| calcium hydroxide | 2 | 5.38 | 1870.11 | 2.59 | 138.6 |

TABLE 34-continued

| Ingredients | Order of addition | % by weight[a] | Anhydrous moles | Anhydrous molar ratio | Weight in grams |
|---|---|---|---|---|---|
| 45% KOH solution | 3 | 9.29 | 1917.13 | 2.66 | 239.0 |
| citric acid, anhydrous | 4 | 5.38 | 721.29 | 1.00 | 138.6 |
| 75% phosphoric acid solution | 5 | 6.12 | 1205.28 | 1.67 | 157.5 |

[a]% by weight based upon total weight of all ingredients taken as 100% by weight.

The resulting high percent solids final product was a very thick viscous liquid. At a 10% dilution, the product was a colloidal suspension with a trace amount of sediment being present at the bottom of the container after sitting overnight. Table 35 lists additional properties of the product, with the percent calcium determined by atomic absorption spectrophotometric assays.

TABLE 35

| Property | Value |
|---|---|
| pH | 6.5 |
| % solids | 45.5%[a] |
| % calcium | 6.6%[a] |
| % yield | 98.4%[b] |

[a]% by weight based upon total weight of composition taken as 100% by weight.
[b]% yield of calcium ion based upon the quantity of calcium ion added during preparation of the composition.

For the following two examples (Examples 14–15), low percent solids formulations with a citric acid:phosphoric acid ratio of 1.0:2.0 were prepared by varying the order of addition of the acids.

EXAMPLE 14

In this example, a prior art formulation (Formula 65 of U.S. Pat. No. 4,214,996) was prepared as described in that patent in order to compare that formulation's solids content and calcium level to those of the instant invention. The ingredients of Table 36 were combined, with continuous mixing, in the order indicated to yield a calcium-enriched composition having a citric acid:phosphoric acid molar ratio of 1.0:2.0. The ingredients were added in 2–3 minute intervals, with mixing being carried out for about 2 minutes after the addition of each ingredient. Upon the addition of the final component (i.e., the citric acid), the mixture was heated to a temperature of about 200° F. and mixing was continued for 30 minutes.

TABLE 36

| Ingredients | Order of addition | % by weight[a] | Anhydrous moles | Anhydrous molar ratio | Weight in grams |
|---|---|---|---|---|---|
| water | 1 | 89.80 | — | — | 5160 |
| calcium hydroxide | 2 | 2.12 | 1.65 | 3.0 | 122.0 |
| 45% KOH solution | 3 | 3.75 | 1.73 | 3.0 | 215.4 |
| 75% phosphoric acid solution | 4 | 2.20 | 1.10 | 2.0 | 143.4 |

TABLE 36-continued

| Ingredients | Order of addition | % by weight[a] | Anhydrous moles | Anhydrous molar ratio | Weight in grams |
|---|---|---|---|---|---|
| citric acid, anhydrous | 5 | 1.84 | 0.55 | 1.0 | 105.6 |

[a]% by weight based upon total weight of all ingredients taken as 100% by weight.

The resulting low percent solids final product was a white opaque suspension. At a 10% dilution, the product was a colloidal suspension with a substantial amount of sediment being present at the bottom of the container after sitting overnight. Table 37 lists additional properties of the product, with the percent calcium determined by atomic absorption spectrophotometric assays.

TABLE 37

| Property | Value |
|---|---|
| pH | 7.45 |
| % solids | 8.27%[a] |
| % calcium | 0.38%[a] |
| % yield | 34.5%[b] |

[a]% by weight based upon total weight of composition taken as 100% by weight.
[b]% yield of calcium ion based upon the quantity of calcium ion added during preparation of the composition.

EXAMPLE 15

This test was similar to that described in Example 14, except that the order of ingredient addition was modified so that phosphoric acid was added last. The ingredients of Table 38 were combined, with continuous mixing, in the order indicated to yield a calcium-enriched composition having a citric acid:phosphoric acid molar ratio of 1.0:2.0. The ingredients were added in 2–3 minute intervals, with mixing being carried out for about 2 minutes after the addition of each ingredient. Upon the addition of the final component (i.e., the 75% phosphoric acid solution), the Mixture was heated to a temperature of about 200° F. and mixing, was continued for 30 minutes (i.e., heating was not carried out to obtain a particular solids content).

TABLE 38

| Ingredients | Order of addition | % by weight[a] | Anhydrous moles | Anhydrous molar ratio | Weight in grams |
|---|---|---|---|---|---|
| water | 1 | 89.68 | — | — | 5110 |
| calcium hydroxide | 2 | 2.14 | 1.65 | 3.0 | 122.2 |
| 45% KOH solution | 3 | 3.80 | 1.74 | 3.0 | 216.3 |
| citric acid, anhydrous | 4 | 1.86 | 0.55 | 1.0 | 105.7 |
| 75% phosphoric acid solution | 5 | 2.53 | 1.10 | 2.0 | 143.9 |

[a]% by weight based upon total weight of all ingredients taken as 100% by weight.

The resulting low percent solids final product was a colloidal suspension with a moderate amount of sediment being present at the bottom of the container. Table 39 lists additional properties of the product, with the percent calcium determined by atomic absorption spectrophotometric assays.

TABLE 39

| Property | Value |
|---|---|
| pH | 7.60 |
| % solids | 9.37%[a] |
| % calcium | 1.64%[a] |
| % yield | 99.0%[b] |

[a]% by weight based upon total weight of composition taken as 100% by weight.
[b]% yield of calcium ion based upon the quantity of calcium ion added during preparation of the composition.

A comparison of Examples 14 and 15 indicate that the soluble calcium content of the prior art formulation is substantially lower than the soluble calcium content achieved when phosphoric acid is added as the last ingredient according to the instant invention.

EXAMPLE 16

Calcium Supplementation of Soy Milk

In this example, samples of soy milk were supplemented with a calcium-enriched composition according to the instant invention. That is, an amount of a calcium-enriched composition as prepared in Example 5 was added to soy milk which had not been previously supplemented with calcium. In each of these instances, the calcium-enriched composition was added in sufficient quantities to give a theoretically expected yield of 98 mg of calcium ions per 100 g of the soy product. The supplemented products were then tested for the actual calcium content by atomic absorption spectrophotometric assays. These results are set forth in Table 40.

TABLE 40

| Commercially available soy milk | Expected calcium ion content (mg Ca/100 g product) | Actual calcium ion content (mg Ca/100 g product ± 10 mg) |
|---|---|---|
| Furama chocolate (shaken top portion) | 98 | 160 |
| Furama plain (unshaken top portion) | 98 | 160 |
| Furama chocolate (unshaken top portion) | 98 | 160 |

Next, commercially available, calcium-enriched soy products were obtained and tested for their actual calcium ion content. These results are shown in Table 41.

TABLE 41

| Commercially available soy milk | Expected calcium ion content (mg Ca/100 g product)[a] | Actual calcium ion content (mg Ca/100 g product ± 10 mg) |
|---|---|---|
| Silk plain (unshaken top portion)[b] | 98 | 48 |
| Silk plain (shaken portion)[b] | 98 | 140 |
| Soy Dream (unshaken top portion)[c] | 98 | 35 |
| Soy Dream (shaken top portion)[c] | 98 | 89 |

[a]according to product label.
[b]calcium source obtained from calcium carbonate according to product label.
[c]calcium source obtained from tricalcium phosphate according to product label.

As shown in Table 41, all of the products except the shaken, Silk plain soy milk had a lower actual calcium ion content than indicated on the label. This was particularly true when the product was not mixed prior to testing, indicating that the calcium was precipitating out of solution. This was not true with the soy milks enriched with the inventive compositions (see Table 40) which each provided high soluble calcium contents in the Furama, even without shaking of the product.

EXAMPLE 17

Calcium Supplementation of Dairy Products

In this example, dairy products were supplemented with a calcium-enriched composition according to the invention and compared with control samples. That is, an amount of a calcium-enriched composition as prepared in Example 5 was added to cow's milk (Belfonte 2% fat milk, labeled as containing 30% of the RDA of calcium per cup or 300 mg of calcium per serving). The inventive composition was mixed with the milk in sufficient quantities to increase the calcium in the milk to about 50% of the RDA of calcium (about 500 mg of calcium per 8 ounces of milk). Three such samples were prepared and are hereinafter referred to as Samples B, E, and H, respectively.

Three additional samples (referred to as Samples C, F, and I) were prepared with sufficient tricalcium phosphate to fortify the milk to about 50% of the RDA of calcium per serving. Samples A, D, and G were the control samples.

Each of the samples was refrigerated and tested at various time intervals to determine the concentration of calcium in the sample. The tested portions of the samples were taken from the unshaken, top portions of the liquid. These results are shown in Table 42.

TABLE 42

| Sample | Day 1[a] | Sample | Day 7[a] | Sample | Day 14[a] | Average | Expected Average | Percent Dispersed |
|--------|----------|--------|----------|--------|-----------|---------|------------------|-------------------|
| A | 1200 | D | 1200 | G | 1100 | 1200 | 1200 | 100% |
| B | 2100 | E | 1900 | H | 2300 | 2100 | 2000 | 100% |
| C | 1200 | F | 1100 | I | 1200 | 1200 | 2000 | 55% |

[a]mg of calcium per quart of milk product

The samples fortified according to the invention (i.e., Samples B, E, and H) had higher calcium concentrations than any of the other samples throughout the entire period of examination. Furthermore, samples B, E, and H achieved the expected, enriched levels of 2000 mg of calcium per quart of milk product. This is due to the fact that all of the calcium in Samples B, E, and H remained suspended while much of the tricalcium phosphate utilized in Samples C, F, and I settled to the bottom of the container. Thus, the latter samples fortified with tricalcium phosphate provided only 1200 mg of calcium per quart of milk product while the samples fortified with the inventive composition achieved the expected 2000 mg of calcium per quart of milk.

We claim:

1. An aqueous, calcium-enriched composition comprising:
   a source of phosphate ions;
   a source of citrate ions;
   a source of calcium ions:
   a quantity of a metal hydroxide; and
   water,
   said composition having a solids content of at least about 35% by weight, based upon the total weight of the composition taken as 100% by weight,
   wherein at least about 70% of the theoretically available quantity of calcium ions will remain dispersed in said composition at ambient temperatures.

2. The composition of claim 1, said source of phosphate ions being phosphoric acid.

3. The composition of claim 1, said composition comprising from about 5–28% by weight phosphate ions, based upon the total weight of the solids in the composition taken as 100% by weight.

4. The composition of claim 1, said source of citrate ions being selected from the group consisting of citric acid, calcium citrate, potassium citrate, and mixtures thereof.

5. The composition of claim 1, said composition comprising from about 5–32% by weight citrate ions, based upon the total weight of the solids in the composition taken as 100% by weight.

6. The composition of claim 1, wherein the molar ratio of citrate ions to phosphate ions in the composition is from about 1.0:1.35 to about 1.0:2.35.

7. The composition of claim 1, wherein said source of calcium ions is selected from the group consisting of calcium hydroxide, calcium carbonate, calcium oxide, and mixtures thereof.

8. The composition of claim 1, wherein said metal hydroxide is an alkali metal hydroxide.

9. The composition of claim 8, wherein said metal hydroxide is selected from the group consisting of potassium hydroxide and sodium hydroxide.

10. The composition of claim 1, wherein said composition comprises at least about 3% by weight calcium ions, based upon the total weight of the solids in the composition taken as 100% by weight.

11. The composition of claim 1, wherein the pH of said composition is from about 5.5–7.5.

12. A food product supplemented with a quantity of the composition of claim 1.

13. The product of claim 12, wherein said food product is selected from the group consisting of dairy products, imitation dairy products, soy-based products, animal foods, mineral supplements, beverages, infant foods, and puddings.

14. The product of claim 13, wherein said food product is selected from the group consisting of milk and soy milk.

15. The product of claim 14, wherein said milk is cow's milk.

16. The product of claim 14, wherein said supplemented product comprises at least about 100 mg more calcium ions per serving than would otherwise be present in the non-supplemented product.

17. The product of claim 14, wherein said product comprises from about 12–60 cc of said composition per liter of product.

18. A method of supplementing a food product with calcium comprising the step of mixing a quantity of the composition of claim 1 with the food product.

19. The method of claim 18, wherein said food product is selected from the group consisting of dairy products, imitation dairy products, soy-based products, animal foods, mineral supplements, beverages, infant foods, and puddings.

20. The method of claim 19, wherein said food product is selected from the group consisting of milk and soy milk.

21. The method of claim 20, wherein said milk is cow's milk.

22. The method of claim 20, wherein said product comprises from about 12–60 cc of said composition per liter of product.

23. The method of claim 18, wherein said supplemented product comprises at least about 100 mg more calcium ions per serving than would otherwise be present in the non-supplemented product.

24. An aqueous, calcium-enriched composition comprising:
   a source of phosphate ions;
   a source of citrate ions;
   a source of calcium ions;
   a quantity of a metal hydroxide; and water,
   the molar ratio of citrate ions to phosphate ions in the composition being from about 1.0:1.35 to about 1.0:2.35, and said composition having a solids content of at least about 20% by weight, based upon the total weight of the composition taken as 100% by weight.
wherein at least about 70% of the theoretically available quantity of calcium ions will remain dispersed in said composition at ambient temperatures.

25. The composition of claim 24, said source of phosphate ions being phosphoric acid.

26. The composition of claim 24, said composition comprising from about 5–28% by weight phosphate ions, based upon the total weight of the solids in the composition taken as 100% by weight.

27. The composition of claim 24, said source of citrate ions being selected from the group consisting of citric acid, calcium citrate, potassium citrate, and mixtures thereof.

28. The composition of claim 24, said composition comprising from about 5–32% by weight citrate ions, based upon the total weight of the solids in the composition taken as 100% by weight.

29. The composition of claim 24, wherein said source of calcium ions is selected from the group consisting of calcium hydroxide, calcium carbonate, calcium oxide, and mixtures thereof.

30. The composition of claim 24, wherein said metal hydroxide is selected from the group consisting of potassium hydroxide and sodium hydroxide.

31. The composition of claim 24, wherein said composition comprises at least about 3% by weight calcium ions, based upon the total weight of the solids in the composition taken as 100% by weight.

32. A food product supplemented with a quantity of the composition of claim 24.

33. The product of claim 32, wherein said product is selected from the group consisting of dairy products, imitation dairy products, soy-based products, animal foods, mineral supplements, beverages, infant foods, and puddings.

34. The product of claim 33, wherein said product is selected from the group consisting of milk and soy milk.

35. The product of claim 34, wherein said milk is cow's milk.

36. The product of claim 34, wherein said supplemented product comprises at least about 100 mg more calcium ions per serving than would otherwise be present in the non-supplemented product.

37. The product of claim 34, wherein said product comprises from about 12–60 cc of said composition per liter of product.

38. A method of supplementing a food product with calcium comprising the step of mixing a quantity of the composition of claim 24 with said food product.

39. The method of claim 38, wherein said food product is selected from the group consisting of dairy products, imitation dairy products, soy-based products, animal foods, mineral supplements, beverages, infant foods, and puddings.

40. The method of claim 39, wherein said food product is selected from the group consisting of milk and soy milk.

41. The method of claim 40, wherein said food product is cow's milk, and said supplemented food product comprises at least about 100 mg more of calcium ions per serving than would otherwise be present in the non-supplemented product.

42. The method of claim 40, wherein said food product is soy milk, and said supplemented food product comprises at least about 500 mg more of calcium ions per serving than would otherwise be present in the non-supplemented product.

43. A method of forming a calcium-enriched composition comprising the steps of:
   forming a precursor mixture comprising:
      a source of citrate ions;
      a source of calcium ions;
      a quantity of a metal hydroxide; and
      water; and
   mixing a source of phosphate ions with said precursor mixture to yield the calcium-enriched composition.

44. The method of claim 43, said source of phosphate ions being phosphoric acid.

45. The method of claim 43, the composition resulting from said mixing step comprising from about 5–28% by weight phosphate ions, based upon the total weight of the solids in the composition taken as 100% by weight.

46. The method of claim 43, said source of citrate ions being selected from the group consisting of citric acid, calcium citrate, potassium citrate, and mixtures thereof.

47. The method of claim 43, the composition resulting from said mixing step comprising from about 5–32% by weight citrate ions, based upon the total weight of the solids in the composition taken as 100% by weight.

48. The method of claim 43, wherein the molar ratio of citrate ions to phosphate ions in the composition is from about 1.0:1.35 to about 1.0:2.35.

49. The method of claim 43, wherein said source of calcium ions is selected from the group consisting of calcium hydroxide, calcium carbonate, calcium oxide, and mixtures thereof.

50. The method of claim 43, wherein said metal hydroxide is an alkali metal hydroxide.

51. The method of claim 50, wherein said metal hydroxide is selected from the group consisting of potassium hydroxide and sodium hydroxide.

52. The method of claim 43, wherein the resulting calcium-enriched composition comprises at least about 3% by weight calcium ions, based upon the total weight of the solids in the composition taken as 100% by weight.

53. The method of claim 43, wherein at least about 70% of the theoretically available quantity of calcium ions will remain dispersed in said calcium-enriched composition at ambient temperatures.

54. The method of claim 43, wherein the pH of the calcium-enriched composition resulting from said mixing step is from about 5.5–7.5.

55. The method of claim 43, wherein said mixing step further comprises heating said precursor mixture to a temperature of about 190–210° F. and mixing the source of phosphate ions with the precursor mixture.

56. A calcium-enriched concentrate adapted for dilution in water to yield an aqueous, calcium-enriched composition, said concentrate comprising:
   an amount of water;
   a source of phosphate ions;
   a source of Citrate ions; and
   a quantity of a metal hydroxide,
   said concentrate being dilutable in water at a dilution ratio of 1 part concentrate with from about 1–4 parts water to yield the aqueous, calcium-enriched composition having a solids content of at least about 35% by weight, based upon the total weight of the diluted composition taken as 100% by weight wherein at least about 70% of the theoretically available quantity of calcium ions will remain dispersed in said composition at ambient temperatures.

57. The concentrate of claim 56, wherein the water is present in said concentrate at a level of less than about 5% by weight, based upon the total weight of the concentrate taken as 100% by weight.

58. A food product supplemented with a quantity of the concentrate of claim 56.

59. A calcium-enriched concentrate adapted for dilution in water to yield an aqueous, calcium-enriched composition, said concentrate comprising:

an amount of water;

a source of phosphate ions;

a source of citrate ions; and a quantity of a metal hydroxide, said concentrate being dilutable in water at a dilution ratio of 1 part concentrate with from about 1–4 parts water to yield the aqueous, calcium-enriched composition having a molar ratio of citrate ions to phosphate ions of from about 1.0:1.35 to about 1.0:2.35 and a solids content of at least about 20% by weight, based upon the total weight of the diluted composition taken as 100% by weight wherein at least about 70% of the theoretically available quantity of calcium ions will remain dispersed in said composition at ambient temperatures.

60. The concentrate of claim 59, wherein the water is present in said concentrate at a level of less than about 5% by weight, based upon the total weight of the concentrate taken as 100% by weight.

61. A food product supplemented with a quantity of the concentrate of claim 59.

* * * * *

UNITED STATES PATENT AND TRADEMARK OFFICE
CERTIFICATE OF CORRECTION

PATENT NO. : 6,248,376 B1
DATED : June 19, 2001
INVENTOR(S) : Bruce Buddemeyer, Weng Kit Cheong, Herman H. Hagedorn It is certified that error appears in the above-identified patent and that said Letters Patent is hereby corrected as shown below:

Column 4,
Line 54, insert after "formulations.", -- Table 3 lists additional properties of the product, with the percent calcium determined by atomic absorption spectrophotometric assays.

Column 4,
Table 2, footnote a:, delete the word "sids" and substitute therefor -- solids --.

Column 7,
Line 20, insert a colon between the words "citric acid" and phosphoric acid".

Column 12,
Table 26, delete the valve "5.12" and substitute therefor -- 15.12 --.

Column 17,
Line 41, delete the word "Mixture" and substitute therefor -- mixture --.

Column 22,
Line 60, delete the word "Citrate" and substitute therefor -- citrate --.

Signed and Sealed this

Nineteenth Day of February, 2002

JAMES E. ROGAN
Director of the United States Patent and Trademark Office

*Attest:*

*Attesting Officer*